United States Patent [19]
Davis et al.

[11] Patent Number: 6,167,023
[45] Date of Patent: *Dec. 26, 2000

[54] RELEASABLE DISC ADAPTOR FOR CONFORMING CENTRAL HUB OF INFORMATION STORAGE DISC TO STANDARDIZED DISC DRIVE SPINDLE

[75] Inventors: Marvin B. Davis, Colorado Springs, Colo.; Clay E. Gaetje, Irvine, Calif.

[73] Assignee: Discovision Associates, Irvine, Calif.

[*] Notice: This patent is subject to a terminal disclaimer.

[21] Appl. No.: 08/846,845

[22] Filed: May 1, 1997

Related U.S. Application Data

[63] Continuation of application No. 08/418,988, Apr. 7, 1995, abandoned.

[51] Int. Cl.[7] .................................................. G11B 3/70
[52] U.S. Cl. ........................ 369/290; 369/289; 369/291
[58] Field of Search .................................. 369/290, 289, 369/291, 270; 360/99.05, 99.12, 133; 206/308.1

[56] References Cited

U.S. PATENT DOCUMENTS

| | | | |
|---|---|---|---|
| 4,495,613 | 1/1985 | Gagnon | 369/270 |
| 4,498,165 | 2/1985 | Wilkinson, Jr. | 369/270 |
| 4,502,136 | 2/1985 | Rickert et al. | 369/271 |
| 4,542,426 | 9/1985 | Wilkinson, Jr. et al. | 360/97 |
| 4,542,495 | 9/1985 | Ziegler et al. | 369/273 |
| 4,545,047 | 10/1985 | Rickert | 369/290 |
| 4,570,194 | 2/1986 | Schatteman | 360/99.12 |
| 4,609,105 | 9/1986 | Manes et al. | 206/444 |
| 4,694,448 | 9/1987 | Tamaru et al. | 369/291 |
| 4,958,839 | 9/1990 | Guzik et al. | 369/271 |
| 5,331,627 | 7/1994 | Childers et al. | 369/291 |

FOREIGN PATENT DOCUMENTS

| | | |
|---|---|---|
| 58-194181 | 11/1983 | Japan ................................ 369/270 |
| 03185689 | 8/1991 | Japan. |
| 4-232644 | 8/1992 | Japan. |
| 04255925 | 9/1992 | Japan. |
| 4-356766 | 12/1992 | Japan. |
| 5-303862 | 11/1993 | Japan. |
| 6-309753 | 11/1994 | Japan. |
| 7-105607 | 4/1995 | Japan. |
| 8-045222 | 2/1996 | Japan. |

*Primary Examiner*—David L. Ometz
*Assistant Examiner*—Kenneth W Fields
*Attorney, Agent, or Firm*—Keiji Masaki; Donald Bollella; Donald L. Wenskay

[57] ABSTRACT

A releasable disc adaptor for conforming the central hub of an information storage disc to a standardized magneto-optical disc drive spindle. The disc adaptor includes a hub receiving member having a center connected to a medium receiving member having a center. The centers of the medium receiving and hub receiving members are collinear. The adaptor includes a hub fastener fixedly mounted to the hub receiving member. The hub fastener is utilized to removably secure the hub receiving member to a disc drive spindle. The adaptor also includes a medium fastener connected to the medium receiving member. The medium fastener is used to removably secure the central hub of an information storage disc to the hub receiving member and prevent slippage therebetween so that the disc hub is thereby conformed to properly seat on the disc drive spindle while thereafter allowing the disc to be fully disengaged from the adaptor members for proper seating on an alternate disc drive spindle. The hub receiving member, medium receiving member, hub fastener, and medium fastener form a portable assembly that may be employed in any one of a plurality of magneto-optical disc drives.

13 Claims, 7 Drawing Sheets

RELEASABLE DISC ADAPTOR FOR CONFORMING CENTRAL HUB OF INFORMATION STORAGE DISC TO STANDARDIZED DISC DRIVE SPINDLE

CROSS REFERENCE TO RELATED APPLICATIONS

This application is a continuation of copending U.S. patent application No. 08/418,988 filed Apr. 7, 1995 now abandoned.

BACKGROUND OF THE INVENTION

1. Field of the Invention

This invention relates to information storage systems and, in particular, to adapter mechanisms to allow information to be recovered from a storage medium by a recording or playback device designed for use with either a different type of storage medium or a plurality of types of storage media.

2. Discussion of the Related Art

Because of the multiplicity of options for data storage media, data often needs to be transferred from one recording or playback device designed for use with one type of storage medium to another device designed for use with a different type of storage medium. In order to avoid data duplication, adapters have been developed to allow use of different types of storage media within a single device.

One example of such an adapter is the phonograph adapter, which allows a single phonograph player to recover information from phono-graph records designed to be played at 33⅓ revolutions per minute, and from phonograph records designed to be played at 45 revolutions per minute, as well as other rotational speeds.

Another example is a permanent hub adapter used in testing laboratories for adapting a Compact Disc—Read Only Memory (CD-ROM) disc for use with a magneto-optical (MO) spindle. This type of hub adapter consists of two magnetizable rings and several screws. The CD-ROM disc is placed between the magnetizable rings, and the rings are screwed together through the CD-ROM disc. This hub adapter essentially drills holes through the CD-ROM disc. Therefore, the adapter is permanently mounted to the disc, and the disc thereafter can not be played in a CD-ROM player.

A further example is a hub adapter designed for commercial or consumer use. The hub adapter consists of a plastic housing, a magnetizable ring, and a connector. The magnetizable ring is mounted within the plastic housing such that the ring may spin relative to the housing. The connector consists of a plurality of plastic tabs extending is from the housing in the direction away from the ring. Each plastic tab has a foot at the end remote from the ring. The hub adapter is designed such that two adapters will fit together with the CD-ROM disc in between. The feet of one adapter snap into a recess in the other adapter, creating a permanent connection. Again, the adapter is not removable, and the CD-ROM disc can no longer be played in a CD-ROM player. Furthermore, this design allows slippage of the CD-ROM disc relative to the adapter during rotation.

There are several options for storage media for computer or other data. Among these options are Compact Disc—Read Only Memory (CD-ROM) discs and magneto-optical (MO) discs. Each of these choices presents certain advantages and disadvantages compared to the other.

Because of these relative advantages and disadvantages, it is often advantageous to store some data on storage media such as CD-ROM discs and other data on storage media such as MO discs. However, this storage option previously had required multiple playback devices. When the amount of data reaches levels where a jukebox is needed for data storage, this storage option requires multiple jukeboxes, dramatically increasing cost and space requirements.

The International Organization for Standardization (ISO) sets industry standards for certain aspects of information-bearing media and playback or recording devices for those media, including CD-ROM discs and MO discs. The standards cover such aspects as media shape and size, hub diameter, and clearance between drive mechanisms and media.

SUMMARY OF THE INVENTION

According to the invention, a cartridge and hub adapter allow playback of a storage medium in a drive mechanism or jukebox designed for playback of a different storage medium, or playback of multiple types of storage media. In the case of adapting a CD-ROM for playback in an MO drive mechanism, the cartridge conforms to the ISO standards for the factors listed above, and the hub adapter adapts a CD-ROM disc to a spindle in an MO disc drive.

DESCRIPTION OF THE PREFERRED EMBODIMENT

Wherever possible in the following description, elements which are the same in different figures are represented by the same reference numeral.

Figure 1:
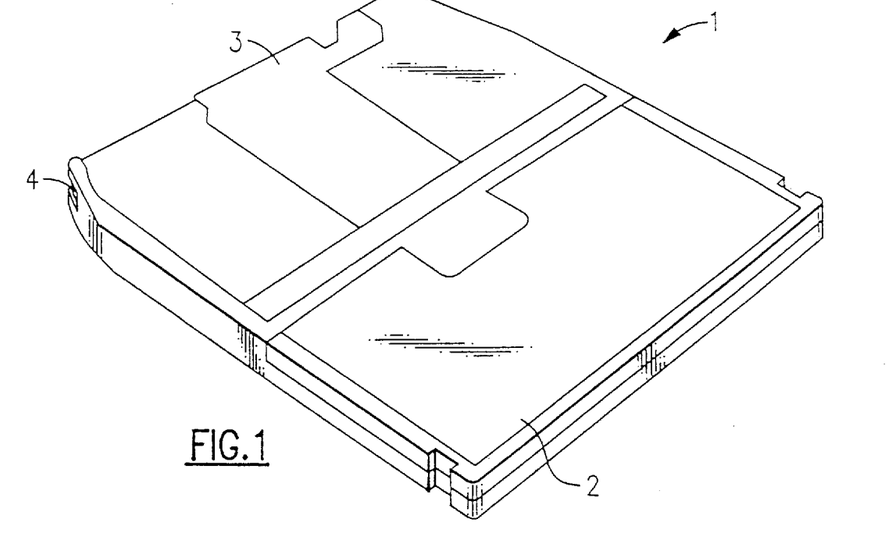
FIG. 1 is a view of one embodiment of a cartridge.

Referring to exemplary FIG. 1, there is shown one embodiment of a cartridge 1, according to one aspect of the invention. The shape and size of the cartridge 1 conforms to the standards established by the International Organization for Standardization (ISO) for magneto-optical (MO) discs. The cartridge 1 has a cover 2 which opens to allow insertion and removal of a storage medium (not shown), such as a Compact Disc—Read Only Memory (CD-ROM) disc. The cover 2 may be transparent to allow the storage medium to be viewed without being removed from the cartridge 1. The cartridge 1 also includes a door access assembly (not shown), which may include a first door 3 and a second door (not shown). The door access assembly (not shown) provides access to the storage medium by an information recovery apparatus (not shown) of the drive mechanism (not shown). In the case of an MO drive mechanism, such an information recovery apparatus (not shown) may include a primary information recovery apparatus, such as an optical assembly, and a secondary information recovery apparatus, such as a magnetic bias coil. Depending on the orientation of the cartridge 1 with respect to the drive mechanism, the first door 3 may provide access to the storage medium by the primary information recovery apparatus and the second door may provide access to the storage medium by the secondary information recovery apparatus, or vice versa.

The cartridge 1 may also include an orientation sensor 4 on one edge of the cartridge 1. Because an MO disc bears information on both sides, it may be inserted into the drive mechanism with either side facing up. However, many types of storage media such as CD-ROM discs bear information on only one side, and require that the cartridge 1 be inserted into the drive mechanism right side up. When inserting the cartridge 1 into a drive mechanism, the orientation sensor 4 engages a stop (not shown) within the drive mechanism, thereby preventing upside-down insertion of the cartridge 1 into the drive mechanism. For use with a storage medium bearing information on both sides, the orientation sensor 4 need not be present on the cartridge 1.

Figure 2:
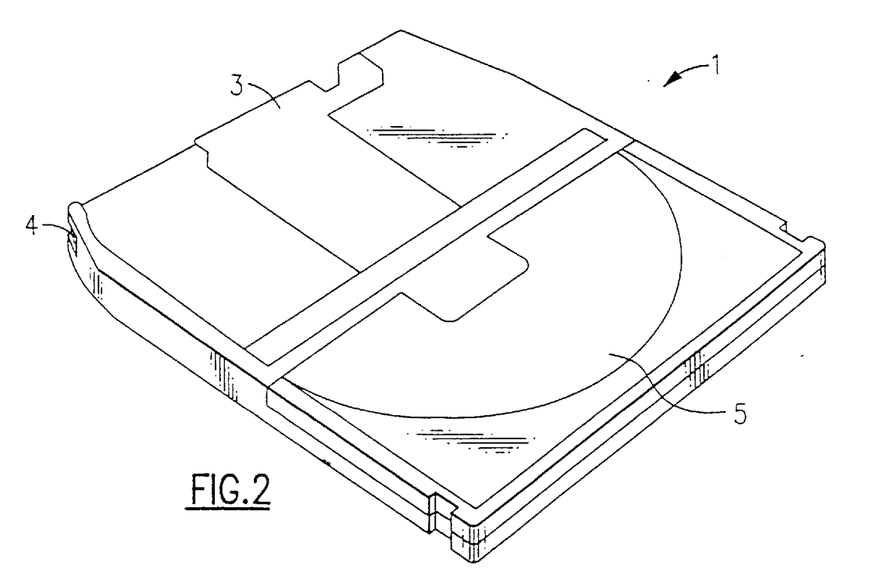
FIG. 2 is a view of one embodiment of a cartridge with the cover removed.

Referring to FIG. 2, there is shown the cartridge 1 of FIG. 1 with the cover 2 removed. A CD-ROM disc 5 has been inserted into the cartridge 1 through the open cover 2. The CD-ROM disc 5 is fitted with a hub adapter (not shown), which adapts the hub of the CD-ROM disc 5 to the spindle of an MO drive mechanism.

FIGS. 3–14 show several views of four embodiments of a hub adapter. Each of these embodiments contains an annular hub receiving ring, an annular medium receiving body, a hub fastener, and a medium fastener assembly. The annular medium receiving body is connected to the hub receiving body such that the center of the medium receiving body lies along the same line as the center of the hub receiving body. The hub fastener is fixedly mounted to the hub receiving body, and removably secures the hub receiving body to the drive mechanism. The medium fastener assembly is connected to the medium receiving body, and removably secures the storage medium relative to the hub receiving body.

Figure 3:
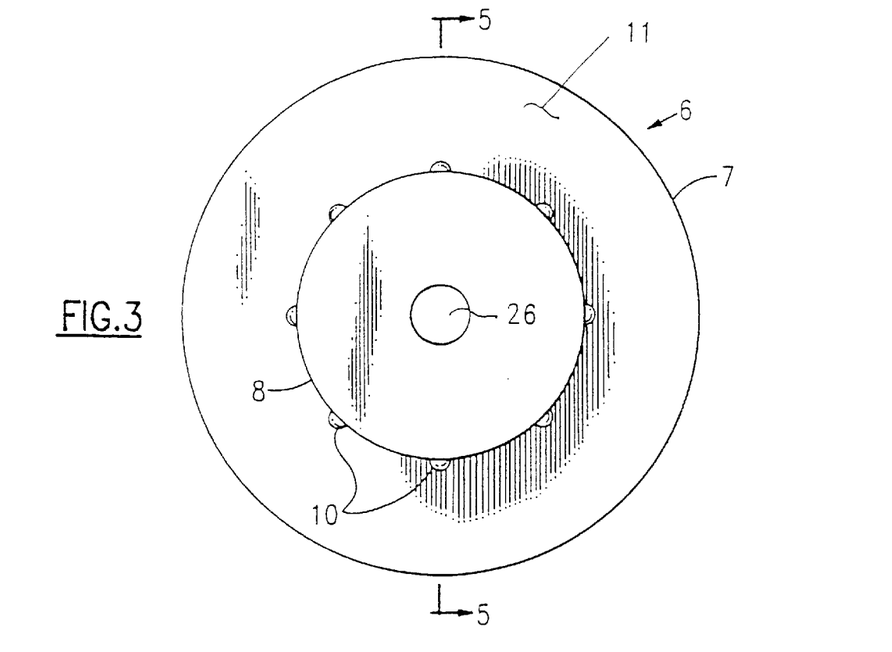
FIG. 3 is a top view of a first embodiment of a hub adapter.
Figure 4:
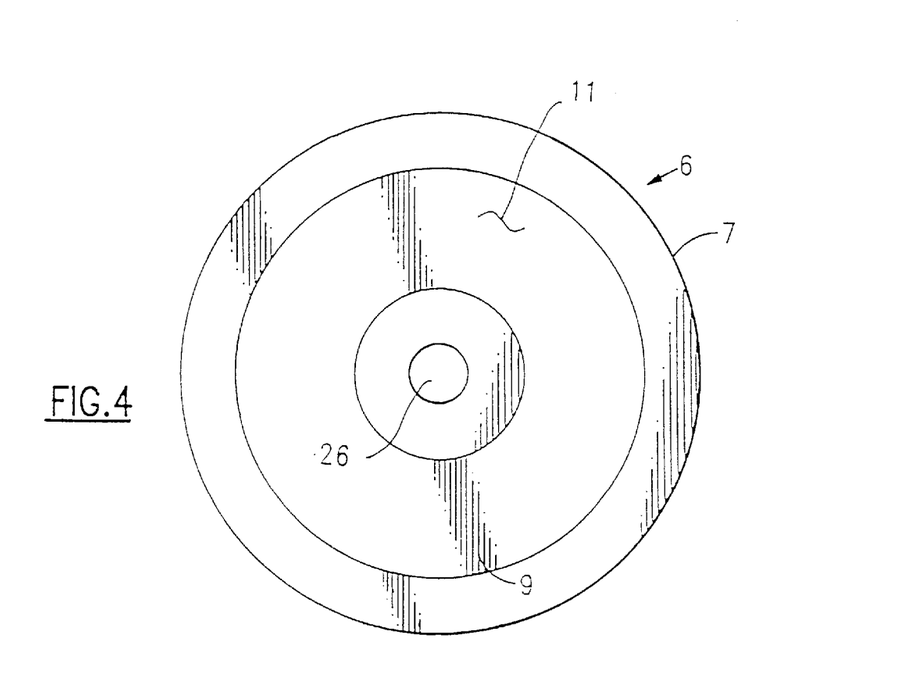
FIG. 4 is a bottom view of a first embodiment of a hub adapter.
Figure 5:
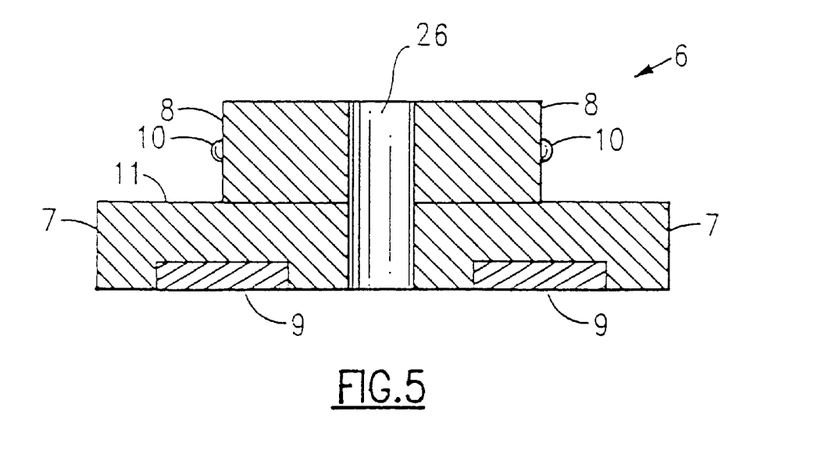
FIG. 5 is a view taken along line 5—5 of FIG. 3.

Referring to FIGS. 3, 4, and 5, there are shown, respectively, a top view, a bottom view, and a cross-sectional view of a first embodiment of the hub adapter 6. The hub adapter 6 includes an annular hub receiving body 7 and an annular medium receiving body 8. The annular medium receiving body 8 may be integral with the annular hub receiving body 7, or may be fixedly mounted by any rigid connection known to one skilled in the art.

In the case of a hub adapter 6 adapted to allow a CD-ROM disc to be played in an MO drive mechanism, the annular hub receiving body 7 has an outer diameter according to the ISO standard established for the outer diameter of the hub of an MO disc. The annular medium receiving body 8 has an outer diameter according to the ISO standard established for the diameter of the center hole of a CD-ROM disc. Both the annular hub receiving body 7 and the annular medium receiving body 8 have an inner diameter according to the ISO standard established for the diameter of the center hole of an MO disc.

The annular hub receiving body 7 includes a hub fastener 9, FIG. 4. The hub fastener 9 may include an annular magnetizable ring. The dimensions of the hub fastener 9, in the case of a hub adapter 6 to adapt a CD-ROM for playback in an MO drive mechanism, are consistent with the ISO standard established for the magnetizable ring in the hub of an MO disc. The annular medium receiving body 8 FIG. 3 has a plurality of ball bearings 10, concentric with the annular medium receiving body 8, extending radially outward from the outer annular surface of the annular medium receiving body 8. The ball bearings 10 are biased outwardly radially from the center of the annular medium receiving body 8, allowing a storage medium (not shown), such as a CD-ROM disc, to be slid over the ball bearings 10, but to provide resistance against unwanted slippage of the storage medium. In this embodiment, these ball bearings 10 are the medium fastener assembly.

In operation, a storage medium (not shown) is placed concentrically with the annular medium receiving body 8 FIG. 5, with an information bearing side of the storage medium toward the annular hub receiving body 7. The ball bearings 10 allow the storage medium to be held in place between the ball bearings 10 and a upper surface 11 of the annular hub receiving body 7. The hub adapter 6, with the storage medium held in place, may be placed on a spindle of a drive mechanism. The spindle of the drive mechanism may have a center pin and an annular magnet. The center pin of the spindle fits into a space or center hole 26 defined by the inner diameters of the annular hub receiving body 7 and the annular medium receiving body 8. The hub fastener 9 of the hub adapter 6 fits against the annular magnet of the spindle. The hub fastener 9 and the annular magnet operate to hold the hub adapter 6 in place during rotation and rotational acceleration.

In other embodiments of the hub adapter, the medium fastener assembly includes an annular connecting body and an annular medium fastening body. The annular connecting body is connected to the medium receiving body at a point remote from the hub receiving body. The annular medium fastening body is connected to the annular connecting body at a point remote from the medium receiving body. The centers of the annular medium fastening body, the annular connecting body, the annular medium receiving body, and the annular hub receiving body lie along the same line.

Figure 6:
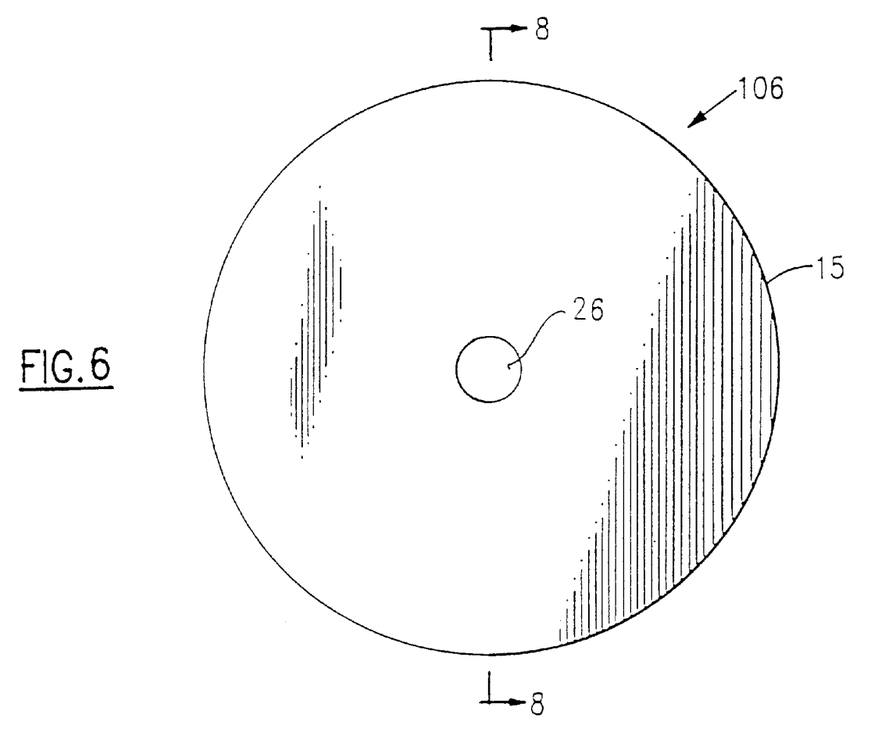
FIG. 6 is a top view of a second embodiment of a hub adapter.
Figure 7:
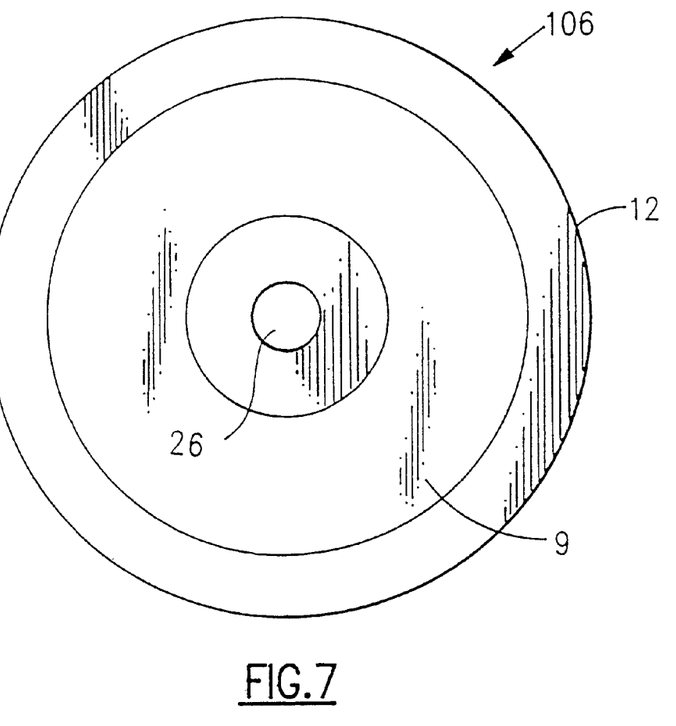
FIG. 7 is a bottom view of a second embodiment of a hub adapter.
Figure 8:
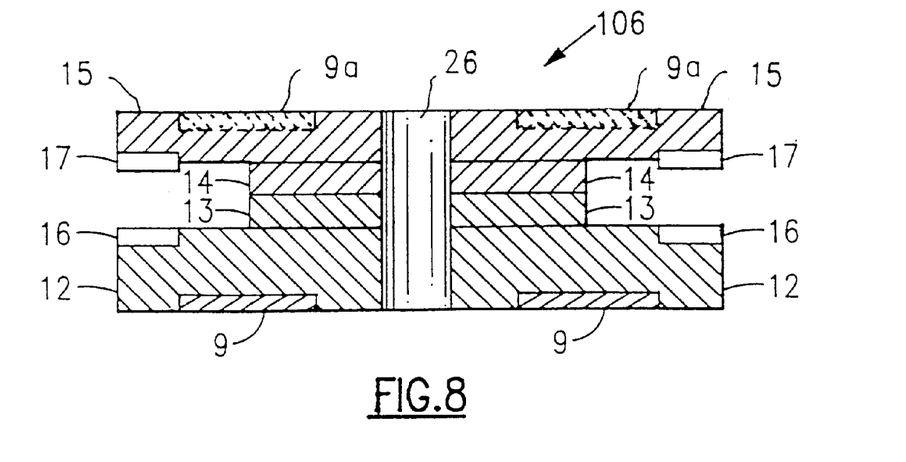
FIG. 8 is a view taken along line 8—8 of FIG. 6.

Referring row to FIGS. 6, 7, and 8, there is shown, respectively, a top view, a bottom view, and a cross-sectional view of a second embodiment of the hub adapter 106. The hub adapter of 106 this embodiment includes an annular hub receiving body 12, an annular medium receiving body 13, an annular connecting body 14, and an annular fastening body 15. The annular hub receiving body 12 may be integral with the annular medium receiving body 13, or may be fixedly mounted by any rigid connection known to one skilled in the art. Similarly, the annular connecting body 14 may be integral with the annular fastening body 15, or may be fixedly mounted by any rigid connection known to one skilled in the art. A surface of the annular medium receiving body 13 opposite the annular hub receiving body 12 is removably connected to a surface of the annular connecting body 14 opposite the annular fastening body 15.

Each of the annular bodies 12, 13, 14, 15 have substantially the same inner diameter. In the case of a hub adapter 106 used to adapt a storage medium for playback with an MO drive mechanism, this inner diameter is defined according to the ISO standard established for the diameter of the center hole of an MO disc. The outer diameter of the annular medium receiving body 13 is substantially equal to the outer diameter of the annular connecting body 14. This outer diameter is substantially equal to the diameter of the center hole of the storage medium. The annular hub receiving body 12 and the annular fastening body 15 each have an outer diameter larger than the outer diameters of the annular medium receiving body 13 and the annular connecting body 14. In the case of a hub adapter 106 employed to adapt a storage medium for playback with an MO drive mechanism, the annular hub receiving body 12 has an outer diameter according to the ISO standard established for the outer diameter of the hub of an MO disc. The annular fastening body 15 has an outer diameter larger than the ISO standard established for the inner diameter of the clamping region of the storage medium.

In operation, the annular medium receiving body 13 and the annular connecting body 14 may be separated, and a storage medium placed between them. The annular bodies 13, 14 may then be reconnected. In this position, the centers of each of the annular bodies 12, 13, 14, 15 lie along the same line. Additionally, the center of the storage medium will lie along the same line as the centers of the annular bodies 12, 13, 14, 15. As stated above, the annular medium receiving body 13 and the annular connecting body 14 are removable under sufficient force, but do not allow movement under rotation and rotational acceleration associated with the drive mechanism. Magnets may be used to form this connection, as may any connection known to one skilled in the art.

The annular hub receiving body 12 has, on a surface opposite the annular medium receiving body 13, a hub fastener 9. The hub fastener 9 may include an annular magnetizable ring. The dimensions of the hub fastener 9, in the case of a hub adapter 106 employed to adapt a CD-ROM for playback in an MO drive mechanism, are consistent with the ISO standard established for the magnetizable ring in the hub of an MO disc. The annular hub receiving body 12 has, on a surface opposing the annular fastening body 15, a lower annular clamping magnet 16. The annular fastening body 15 has, on a surface opposing the annular hub receiving body 12, an upper annular clamping magnet 17. The annular clamping magnets 16, 17 oppose each other, and, in operation, clamp a storage medium in place through magnetic force, to prevent unwanted slippage.

The annular fastening body 15 may have, on a surface opposite from the annular connecting body 14, a second hub fastener 9a shown in phantom. The second hub fastener 9a has the same structure and function as the hub fastener 9. The second hub fastener 9a when employed would allow the hub adapter 6 to be inserted into the drive mechanism upside-down, to allow for playback of storage media with information recorded on both sides, without removing the hub adapter 6 from the storage medium.

Figure 9:
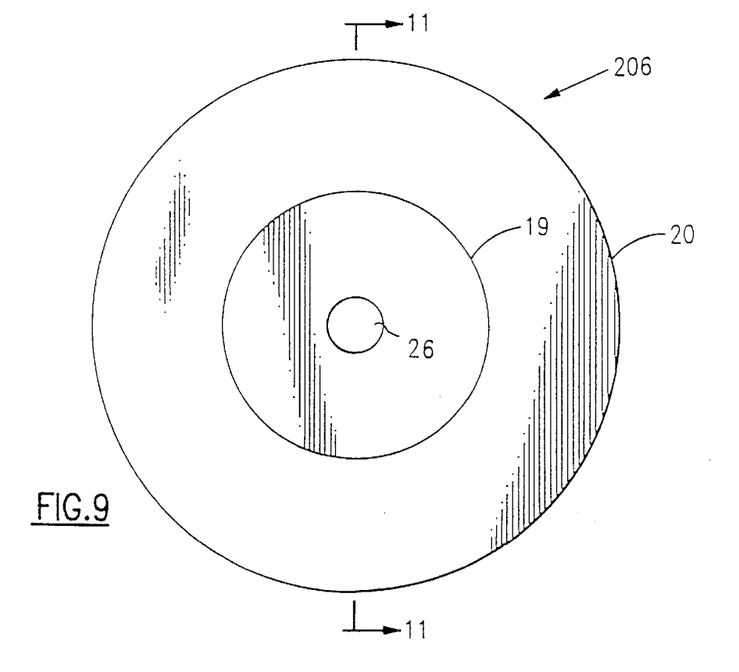
FIG. 9 is a top view of a third embodiment of a hub adapter.
Figure 10:
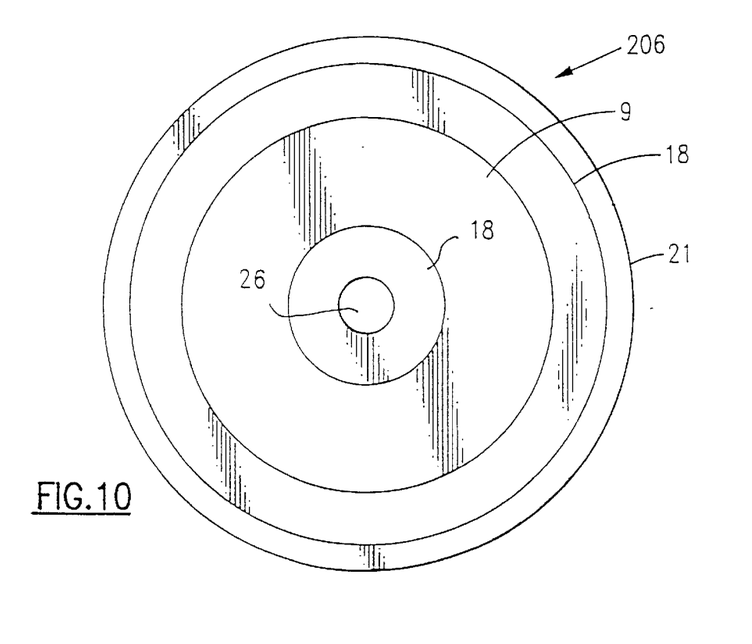
FIG. 10 is a bottom view of a third embodiment of a hub adapter.
Figure 11:
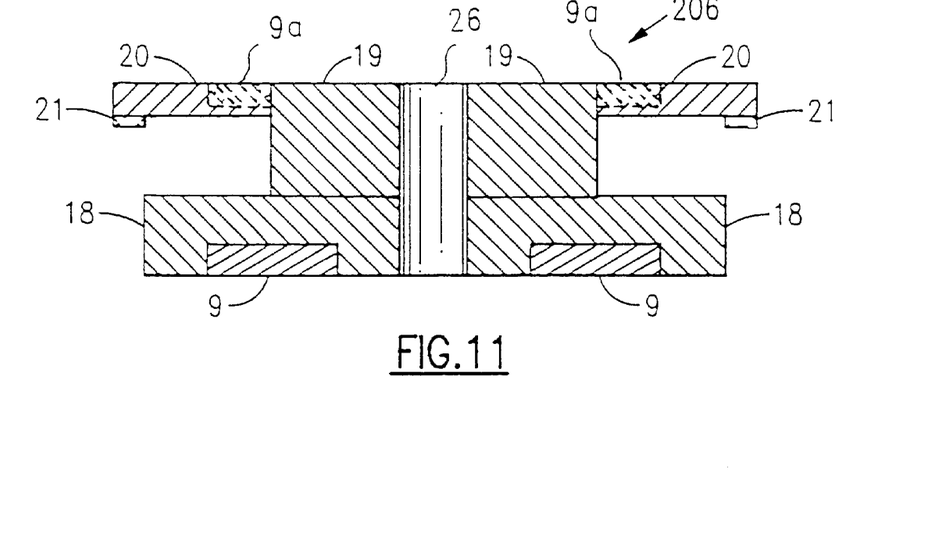
FIG. 11 is a view taken along line 11—11 of FIG. 9.

Referring to FIGS. 9, 10, and 11, there is shown, respectively, a top view, a bottom view, and a cross-sectional view of a third embodiment of the hub adapter 206. The hub adapter 206 according to this embodiment includes an annular hub receiving body 18, an annular medium receiving body 19, an annular connecting body 20, and an annular fastening body 21. The annular hub receiving body 18 may be integral with the annular medium receiving body 19, or may be fixedly mounted by any rigid connection known to one skilled in the art. Similarly, the annular connecting body 20 may be integral with the annular fastening body 21, or may be fixedly mounted by any rigid connection known to one skilled in the art.

The inner diameters of the annular hub receiving body 18 and the annular medium receiving body 19 are substantially equal, and, in the case of a hub adapter 206 employed to adapt a storage medium for playback with an MO drive mechanism, these inner diameters are defined according to the ISO standard established for the diameter of the center hole of an MO disc. The outer diameter of the annular medium receiving body 19 is substantially equal to the diameter of the center hole of the storage medium. The annular hub receiving body 18 has an outer diameter larger than the outer diameter of the annular medium receiving body 19. In the case of a hub adapter 206 used to adapt a storage medium for playback with an MO drive mechanism, the annular hub receiving body 18 has an outer diameter according to the ISO standard established for the outer diameter of the hub of an MO disc.

The annular medium receiving body 19 is removably connected to the annular connecting body 20 along the surface defining the outer diameter of the annular medium receiving body 19. This connection is breakable under sufficient force, but does not allow movement under rotation and rotational acceleration associated with the drive mechanism. Magnets may be used to form this connection, as may any suitable connection known to one skilled in the art.

The annular connecting body 20 has an inner diameter substantially equal to the outer diameter of the annular medium receiving body 19. The annular connecting body 20 has an outer diameter larger than the ISO standard established for the inner diameter of the clamping region of the storage medium. The annular fastening body 21 is fixedly mounted to or integral with the annular connecting body 20 on a surface of the annular connecting body 20 which faces the annular hub receiving body 18. The annular fastening body 21 has an outer diameter which may be substantially equal to the outer diameter of the annular connecting body 20, and an inner diameter which may be larger than the outer diameter of the annular medium receiving body 19.

In operation, the annular connecting body 20 is removed from the annular medium receiving body 19. A storage medium is then placed concentrically around the annular medium receiving body 19, and the annular connecting body 20 is connected to the annular medium receiving body 19. In this position, the center of the storage medium and the centers of the annular bodies 18, 19, 20, 21 all lie along the same line within the hole 26. The distance between the annular fastening body 21 and the annular hub receiving body 18, taken normal to the plane of the storage medium, is smaller than the thickness of the storage medium. Therefore, a clamping force between the annular fastening body 21 and the annular hub receiving body 18 is provided to clamp the storage medium in place and to prevent unwanted slippage. The thickness of the annular connecting body 20 is sufficient to withstand the force applied by the annular fastening body 21. Together, the annular fastening body 21 and the annular hub receiving body 18 function as the medium fastener.

The annular hub receiving body 18 has, on the surface opposite the annular medium receiving body 19 and the storage medium, a hub fastener 9. The hub fastener 9 may include an annular magnetizable ring. The dimensions of the hub fastener 9, in the case of a hub adapter 206 utilized to adapt a CD-ROM for playback in an MO drive mechanism, are consistent with the ISO standard established for the magnetizable ring in the hub of an MO disc. Similarly, the annular connecting body 20 may have, on the surface opposite the annular fastening ring 21 and the storage medium, a second hub fastener 9a shown in phantom. The second hub fastener 9a has the same structure and function as the hub fastener 9. The second hub fastener 9a would allow the hub adapter 206 to be inserted into the drive mechanism upside-down, to allow for playback of storage media with information recorded on both sides, without removing the hub adapter 6 from the storage medium.

Figure 12:
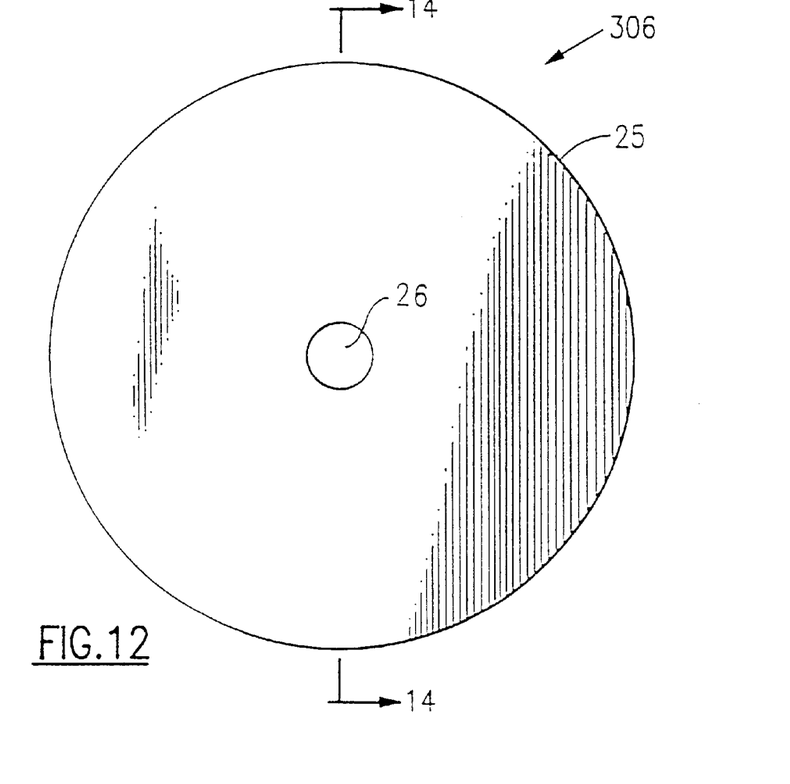
FIG. 12 is a top view of a fourth embodiment of a hub adapter.
Figure 13:
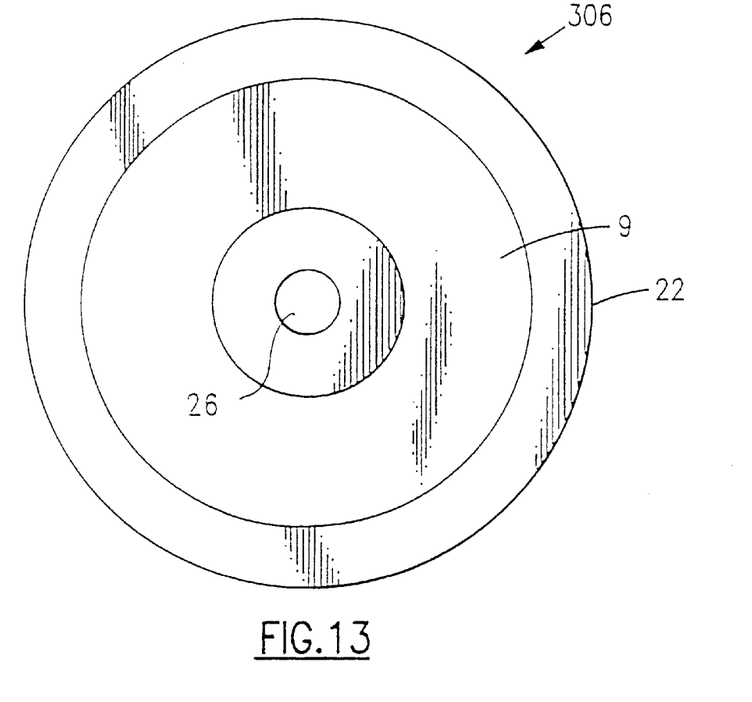
FIG. 13 is a bottom view of a fourth embodiment of a hub adapter.
Figure 14:
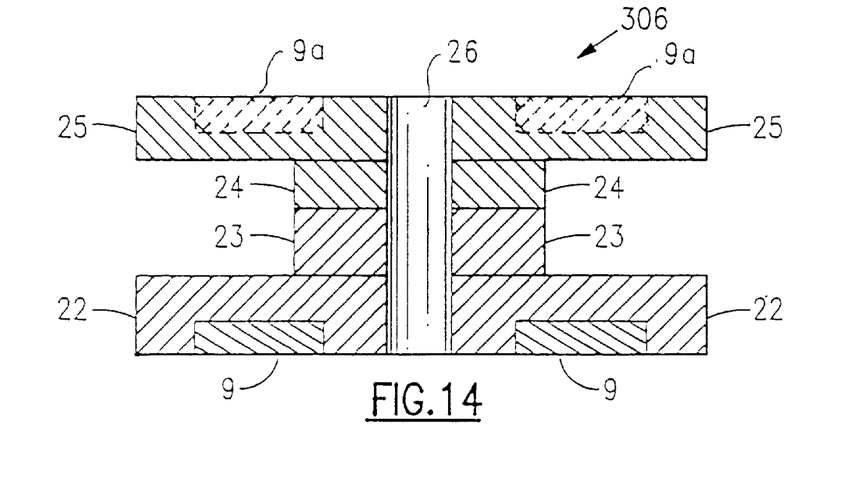
FIG. 14 is a view taken along line 14—14 of FIG. 12.

With reference now to FIGS. 12, 13, and 14, there is shown, respectively, a top view, a bottom view, and a cross-sectional view of a fourth embodiment of the hub adapter 306. The hub adapter according to 306 this embodiment includes an annular hub receiving body 22, an annular medium receiving body 23, an annular connecting body 24, and an annular fastening body 25. The annular hub receiving body 22 may be integral with the annular medium receiving body 23, or may be fixedly mounted by any suitable rigid connection known to one skilled in the art. Similarly, the annular connecting body 24 may be integral with the annular fastening body 25, or may be fixedly mounted by any rigid connection known to one skilled in the art. A surface of the annular medium receiving body 23 opposite the annular hub receiving body 22 is removably connected to a surface of the annular connecting body 24 opposite the annular fastening body 25.

Each of the annular bodies 22, 23, 24, 25 have substantially the same inner diameter. In the case of a hub adapter 306 employed to adapt a storage medium for playback with an MO drive mechanism, this inner diameter is defined according to the ISO standard established for the diameter of the center hole of an MO disc. The outer diameter of the annular medium receiving body 23 is substantially equal to the outer diameter of the annular connecting body 24. This outer diameter is substantially equal to the diameter of the center hole of the storage medium. The annular hub receiving body 22 and the annular fastening body 25 each have an outer diameter larger than the outer diameters of the annular medium receiving body 23 and the annular connecting body 24. In the case of a hub adapter 306 utilized to adapt a storage medium for playback with an MO drive mechanism, the annular hub receiving body 22 has an outer diameter according to the ISO standard established for the outer diameter of the hub of an MO disc. The annular fastening body 25 has an outer diameter larger than the ISO standard established for the inner diameter of the clamping region of the storage medium.

In operation, the annular medium receiving body 23 and the annular connecting body 24 may be separated, and a storage medium placed between them. The annular bodies 23, 24 may then be reconnected. In this position, the centers of each of the annular bodies 22, 23, 24, 25 lie along the same line within hole 26. Additionally, the center of the storage medium will lie along the same line as the centers of the annular bodies 22, 23, 24, 25. As stated above, the annular medium receiving body 23 and the annular connecting body 24 are removable under sufficient force, but do not allow movement under rotation and rotational acceleration associated with the drive mechanism. Magnets may be used to form this connection, as may any suitable connection known to one skilled in the art.

The distance between the annular fastening body 25 and the annular hub receiving body 22, taken normal to the plane of the storage medium, is smaller than the thickness of the storage medium. Therefore, a clamping force between the annular fastening body 25 and the annular hub receiving body 22 is provided to clamp the storage medium in place and to prevent unwanted slippage. The thickness of the annular fastening body 25 is sufficient to withstand this clamping force. Together, the annular fastening body 25 and the annular hub receiving body 22 function as the medium fastener.

The annular hub receiving body 22 has, on a surface opposite the annular medium receiving body 23, a hub fastener 9. The hub fastener 9 may includes an annular magnetizable ring. The dimensions of the hub fastener 9, in the case of a hub adapter 306 used to adapt a CD-ROM for playback in an MO drive mechanism, are consistent with the ISO standard established for the magnetizable ring in the hub of an MO disc.

The annular fastening body 25 may have, on a surface opposite from the annular connecting body 24, a second hub fastener 9a shown in phantom. The second hub fastener 9a has the same structure and function as the hub fastener 9. The second hub fastener 9a would allow the hub adapter 306 to be inserted into the drive mechanism upside-down, to allow for playback of storage media with information recorded on both sides, without removing the hub adapter 306 from the storage medium.

With any of the embodiments of the hub adapter 306 described above, the hub fastener 9 may cover or form, respectively, the entire lower surface of the annular hub receiving body 7, 12, 18, 22. In addition, the second hub fastener 9a may comprise the entire upper surface of the annular fastening body 15, 25 or the annular connecting body 20. Additionally, any of the embodiments of the hub adapter 306 may be rotatably mounted to the interior of the cartridge 1. Furthermore, in the embodiments of the hub adapter 306 comprising more than one integral piece, either of the integral pieces may be rotatably mounted to the interior of the cartridge 1.

It will be apparent to one skilled in the art that adjustments may be required in the mechanical or optical features of the drive. These adjustments would allow a single optical assembly to determine which type of media is in the drive, and set parameters such as working position of the carriage assembly, expected track width, expected track pitch, and size of media. This determination may be made by trial and error by the drive, or there may be a switch on the cartridge 1 which alerts the drive that a storage medium which requires adaptation, such as a CD-ROM disc, is being inserted. In the latter case, an assembly to recognize the switch must then be added to the drive mechanism. The structure and operation of such a switch and assembly would be readily apparent to one skilled in the art.

While this invention has been described in detail with reference to certain preferred embodiments, it should be appreciated that the present invention is not limited to those precise embodiments. Rather, in view of the present disclosure which describes the current best mode for practicing the invention, many modifications and variations would present themselves to those of skill in the art without departing from the scope and spirit of this invention. The scope of the invention is, therefore, indicated by the following claims rather than by the foregoing description. All changes, modifications, and variations coming within the meaning and range of equivalency of the claims are to be considered within their scope.

What is claimed is:

1. A releasable disc adaptor for conforming the central hub of a CD type information storage disc to a magneto-optical disc drive having a spindle having a center pin and an annular magnet for securing the disc for rotation, said adaptor comprising:

an annular hub receiving member having an inner diameter sized to receive said center pin such that said center pin is substantially flush with said hub receiving member, said hub receiving member also having a center;

an annular medium receiving member having an inner diameter sized to receive said center pin such that said center pin is substantially flush with said medium receiving member, said medium receiving member also having a center, said medium receiving member being connected to and flush with said hub receiving member such that the centers of said medium receiving member and said hub receiving member are collinear and the holes defined by said inner diameters of said hub receiving member and said medium receiving member align to form a substantially continuous bore;

a hub fastener fixedly mounted to said hub receiving member, said hub fastener for removably securing said hub receiving member to said disc-drive annular magnet; and a medium fastener assembly connected to said medium receiving member, said medium fastener assembly including an annular connecting member having a center having an inner diameter sized to receive said center pin such that said center pin is substantially flush with said connector member, said connecting member removably connected to said medium receiving member at a point remote from said hub receiving member, said medium fastener assembly further including an annular medium fastening member having a center, said medium fastening member connected to said connecting member at a point remote from said medium receiving member, the centers of said medium fastening member, said connecting member, said medium receiving member, and said hub receiving member being collinear;

said medium fastener assembly removably securing a respective central hub of a CD type information storage disc to said hub receiving member, said medium fastener assembly further including means for preventing slippage of the disc so that the disc hub is thereby conformed to properly seat on said disc-drive spindle while thereafter allowing the disc to be fully disengaged from said hub receiving member, said medium receiving member and said medium fastener assembly for proper seating on a CD type disc drive spindle and;

said hub receiving member, medium receiving member, hub fastener, and medium fastener assembly forming a portable assembly that may be employed in any one of a plurality of different magneto-optical disc drives.

2. The adaptor according to claim 1 wherein said connecting member is connected to said medium receiving member at a surface of said medium receiving member opposite said hub receiving member; said connecting member has a diameter substantially equal to a diameter of said medium receiving member; said medium fastening member is connected to said connecting member at a surface of said connecting member opposite said medium receiving medium receiving member; and said medium fastening member has a diameter larger than the diameter of said connecting member.

3. The adaptor according to claim 1 wherein said medium fastening member includes an upper annular fastening ring fixedly mounted to a surface of said medium fastening member opposing said hub receiving member; and a lower annular fastening ring fixedly mounted to a surface of said hub receiving member, said lower fastening ring being opposite said upper fastening ring and magnetically attracted thereto.

4. The adaptor according to claim 1 wherein said hub receiving member is fixedly mounted to said medium receiving member; said connecting member has a diameter substantially equal to a diameter of said medium receiving member; said medium fastening member has an inner diameter substantially equal to an inner diameter of said medium receiving member and an outer diameter larger than an outer diameter of said medium receiving member; and said medium fastening member is fixedly mounted to said connecting member at a surface of said connecting member remote from said medium receiving member, said medium fastening and said hub receiving members providing a clamping force on the disc when placed therebetween concentrically with said medium receiving member.

5. The adaptor according to claim 1 wherein said hub receiving member is integral with said medium receiving member said connecting member has a diameter substantially equal to a diameter of said medium receiving member; said medium fastening member has an inner diameter substantially equal to an inner diameter of said medium receiving member and an outer diameter larger than an outer diameter of said medium receiving member; said medium fastening member is integral with said connecting member at a surface of said connecting member remote from said medium receiving member, said medium fastening member and said hub receiving members providing a clamping force on the disc when placed therebetween concentrically with said medium receiving member.

6. The adaptor according to claim 1 further including a second hub fastener in fixed relation to said hub receiving member on an opposite side of the disc relative to said first hub fastener.

7. The adaptor according to claim 1 wherein the hole defined by said inner diameter of said connector member is collinear with the holes of said hub receiving member and said medium receiving member and forms, therewith, a substantially continuous bore.

8. The adaptor according to claim 7 wherein said medium fastening member has an inner diameter sized to receive said center pin such that said center pin is substantially flush with said medium fastening member.

9. The adaptor according to claim 8 wherein the hole defined by said inner diameter of said medium fastening member is collinear with the holes of said hub receiving member, said medium receiving member and said medium fastening member and forms, therewith, a substantially continuous bore.

10. The adaptor according to claim 1 wherein said connector member, when connected to said medium receiving member, is substantially flush with said medium receiving member and connected thereto by magnetic coupling.

11. The adaptor according to claim 1 wherein said hub fastener includes an annular magnet.

12. The adaptor according to claim 1 wherein said hub receiving member is fixedly mounted to said medium receiving member.

13. The adaptor according to claim 1 wherein said hub receiving member is integral with said medium receiving member.

* * * * *

UNITED STATES PATENT AND TRADEMARK OFFICE
CERTIFICATE OF CORRECTION

PATENT NO. : 6,167,023
DATED : December 26, 2000
INVENTOR(S) : Clay E. Gaetje It is certified that error appears in the above-identified patent and that said Letters Patent is hereby corrected as shown below:

<u>Title page,</u>
Item [75], Inventors, delete "Marvin B. Davis, Colorado Springs, Colo.;"

Signed and Sealed this

Twenty-fifth Day of March, 2003

JAMES E. ROGAN
*Director of the United States Patent and Trademark Office*